United States Patent
Mutoh (10) Patent No.: US 8,059,351 B2
(45) Date of Patent: Nov. 15, 2011

(54) MAGNETIC RECORDING APPARATUS AND MAGNETIC RECORDING MEDIUM

(75) Inventor: Hiroshi Mutoh, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/821,036

(22) Filed: Jun. 22, 2010
(Under 37 CFR 1.47)

(65) Prior Publication Data
US 2011/0090583 A1 Apr. 21, 2011

(30) Foreign Application Priority Data

Jun. 26, 2009 (JP) .................................. 2009-152964

(51) Int. Cl.
*G11B 5/09* (2006.01)
(52) U.S. Cl. ......................................................... 360/48
(58) Field of Classification Search .................. 360/48, 360/51, 75; 711/147, 154
See application file for complete search history.

(56) References Cited

U.S. PATENT DOCUMENTS

| | | | | |
|---|---|---|---|---|
| 4,819,097 A * | 4/1989 | Azuma et al. | .................. | 386/314 |
| 5,802,584 A * | 9/1998 | Kool et al. | ...................... | 711/154 |
| 5,812,335 A * | 9/1998 | Kool et al. | ........................ | 360/51 |
| 5,812,755 A * | 9/1998 | Kool et al. | ................... | 714/6.13 |
| 6,449,111 B1 * | 9/2002 | Kool et al. | ........................ | 360/48 |
| 6,982,937 B2 * | 1/2006 | Kanaoka et al. | ............ | 369/47.17 |
| 7,486,467 B2 * | 2/2009 | Sai et al. | .......................... | 360/75 |
| 7,660,065 B2 * | 2/2010 | Suzuki | .............................. | 360/75 |
| 2008/0273258 A1 * | 11/2008 | Berman et al. | .............. | 360/77.12 |

FOREIGN PATENT DOCUMENTS

| | | |
|---|---|---|
| JP | 2004-280898 | 7/2004 |
| JP | 2005-108410 | 4/2005 |
| WO | WO99/45534 | 9/1999 |

OTHER PUBLICATIONS

Wood et al., "The Feasibility of Magnetic Recording at 10 Terabits per Square Inch on Conventional Media," TMRC 2008, Singapore, Jul. 29-31, 2008 pp. 1-41 and an English translation of Concise Explanation of the Relevance thereof.
Notice of Rejection mailed on Jun. 7, 2011 in Japanese Application No. JP 2009-152964.

* cited by examiner

*Primary Examiner* — Fred Tzeng
(74) *Attorney, Agent, or Firm* — Knobbe Martens Olson & Bear LLP (57) ABSTRACT

According to one embodiment, a magnetic recording apparatus includes: an information recording module configured to record a predetermined number of lines of information with a predetermined length in an information recording region of a magnetic recording medium, each of the lines of information having a same recording start position with respect to a relative movement direction of the magnetic recording medium and a recording element, the each of the lines of information being provided with an overlaying portion of adjacent lines of information. The information recording module is configured to record clock information in one or a plurality of the lines of information.

5 Claims, 6 Drawing Sheets

FIG.10 b81

MAGNETIC RECORDING APPARATUS AND MAGNETIC RECORDING MEDIUM

CROSS-REFERENCE TO RELATED APPLICATIONS

This application is based upon and claims the benefit of priority from Japanese Patent Application No. 2009-152964, filed Jun. 26, 2009, the entire contents of which are incorporated herein by reference.

BACKGROUND

1. Field

One embodiment of the invention relates to a magnetic recording apparatus and a magnetic recording medium.

2. Description of the Related Art

The rapid development of information technology (IT) and diverse demands in various information dramatically increase the amount of information produced. Magnetic disk devices are suitable, in terms of capacities, bit costs for storage, access performances, reliability, or the like, for storing therein a large amount of information. In order to increase the capacities of the magnetic disk devices, a recording density is required to be increased. Hence, various technologies for achieving high density recording have been studied and developed.

Increasing a recording density has limitation called trilemma. When the minimum unit of magnetization for recording is reduced to increase the recording density, the recorded information is to be lost after a long period of time because the information recorded with a small unit of recording is thermally unstable. Further, with the use of a recording medium having a magnetic characteristic that is not easily lost, magnetic poles are saturated due to the material characteristics of the magnetic pole of a recording element, thereby results in a state where a sufficient recording magnetic field cannot be output. Still further, when size of the minimum unit of magnetization is increased, the number of units of magnetization each corresponding to one bit of information decreases so as to increase noise (medium noise) in the transition region. As a result, recording and reproduction with sufficient reliability becomes impossible. As described above, the three of a thermal relaxation characteristic, a writing characteristic, and signal quality, are in a trade-off relationship with each other.

The conventional technologies that surmount the limitation on a recording density are, for example, a bit patterned media system, an energy assisted recording system, and a shingle write/two-dimensional magnetic recording (TDMR) system. In the bit patterned media system, one bit of information is recorded in association with a recording land that is physically isolated and provided on a medium. With this system, the volume of the minimum unit of recording can be enlarged and thus the recorded information is less affected by thermal relaxation. The energy assisted recording system is a system by which writing is performed using a magnetic material that is difficult to be magnetically inverted at room temperature by assisting a recording magnetic field with external energy only during recording. For the external energy, thermal energy produced by a laser beam, excitation energy of magnetic spins produced by a microwave, and the like have been studied. With this system, the writing characteristic out of the three factors that inhibits the density from being increased is improved.

In the shingle write/TDMR system, during recording, a number of tracks of recordings each being formed in a movement direction of a recording medium are overlaid with each other with slight offset and recorded in the recording medium to record the information, using a recording element that has a comparatively wide recording width. During reading, magnetic information in a unit of recording/reproduction is read two-dimensionally, using a reading element having comparatively high resolution, and then the information recorded by a two-dimensional signal process is demodulated.

The magnetic recording system as described above is known as a shingle write system or a TDMR system (for example, see The Magnetic Recording Conference (TMRC) 2008, Jul. 31, 2008, Session CC: Recording Physics of Novel Media CC-4 "The feasibility of magnetic recording at 10 Terabits per square Inch on conventional media).

However, in a magnetic recording system disclosed in the conventional technology, clock signals necessary to obtain information by reading one unit of recording/reproducing is not considered. Stable clock signals are required to perform a two-dimensional signal process on the information.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

SUMMARY

In some embodiments, a magnetic recording apparatus comprises: an information recording module configured to record a predetermined number of lines of information with a predetermined length in an information recording region of a magnetic recording medium, each line of information having a same recording start position with respect to a relative movement direction of the magnetic recording medium and a recording element, each line of information comprising an overlapping portion of adjacent lines of information, wherein the information recording module is configured to record clock information in one or a plurality of the lines of information.

In some embodiments, a magnetic recording medium comprises: an information recording region configured to store a predetermined number of lines of information with a predetermined length in a relative movement direction of the magnetic recording medium and a recording element, each line of information having a same recording start position with respect to the relative movement direction, each line of information comprising an overlapping portion with adjacent lines of information, wherein one or a plurality of the lines of information is configured to store clock information.

DETAILED DESCRIPTION

Various embodiments according to the invention will be described hereinafter with reference to the accompanying drawings. In general, according to one embodiment of the invention, a magnetic recording apparatus, comprises: an information recording module configured to record a predetermined number of lines of information with a predetermined length in an information recording region of a magnetic recording medium, each of the lines of information having a same recording start position with respect to a relative movement direction of the magnetic recording medium and a recording element, the each of the lines of information being provided with an overlaying portion of adjacent lines of information. The information recording module is configured to record clock information in one or a plurality of the lines of information.

According to another embodiment of the invention, a magnetic recording medium comprises: an information recording region on which a predetermined number of lines of information with a predetermined length are recorded in a relative movement direction of the magnetic recording medium and a recording element, each of the lines of information having a same recording start position with respect to the relative movement direction, the each of the lines of information being provided with an overlaying portion of adjacent lines of information. Clock information is recorded in one or a plurality of the lines of information.

In the following, "a region corresponding to one unit of recording/reproduction" on a magnetic recording medium is also referred to as "an information recording region" hereinafter. In addition, "clock information" is also referred to as a "clock signal".

In the following, a magnetic recording by the shingle write/TDMR system is explained as an example. In the shingle write/TDMR system, when information is magnetically recorded on a magnetic recording medium, data with a certain length is recorded on the magnetic recording medium in a relative movement direction of the magnetic recording medium and a recording element. Subsequently, another data with the same length is recorded from the same recording start position in the relative movement direction but slightly offset from a line of the previously recorded data in a direction perpendicular to the line, so that an overlaying portion is formed by the line of previously recorded data and the line of subsequently recorded data. This operation is repeated a plurality of times to complete one complete unit of data recording. When the data recorded on the magnetic recording medium in such a manner is to be read, the recorded data is demodulated by: reading the entire region to which the data of the one complete unit of data recording is recorded using a reading element with high resolution; and performing a signal process (two-dimensional signal process) by developing the data of the one complete unit of the data recording into a two-dimensional plane.

Figure 1:
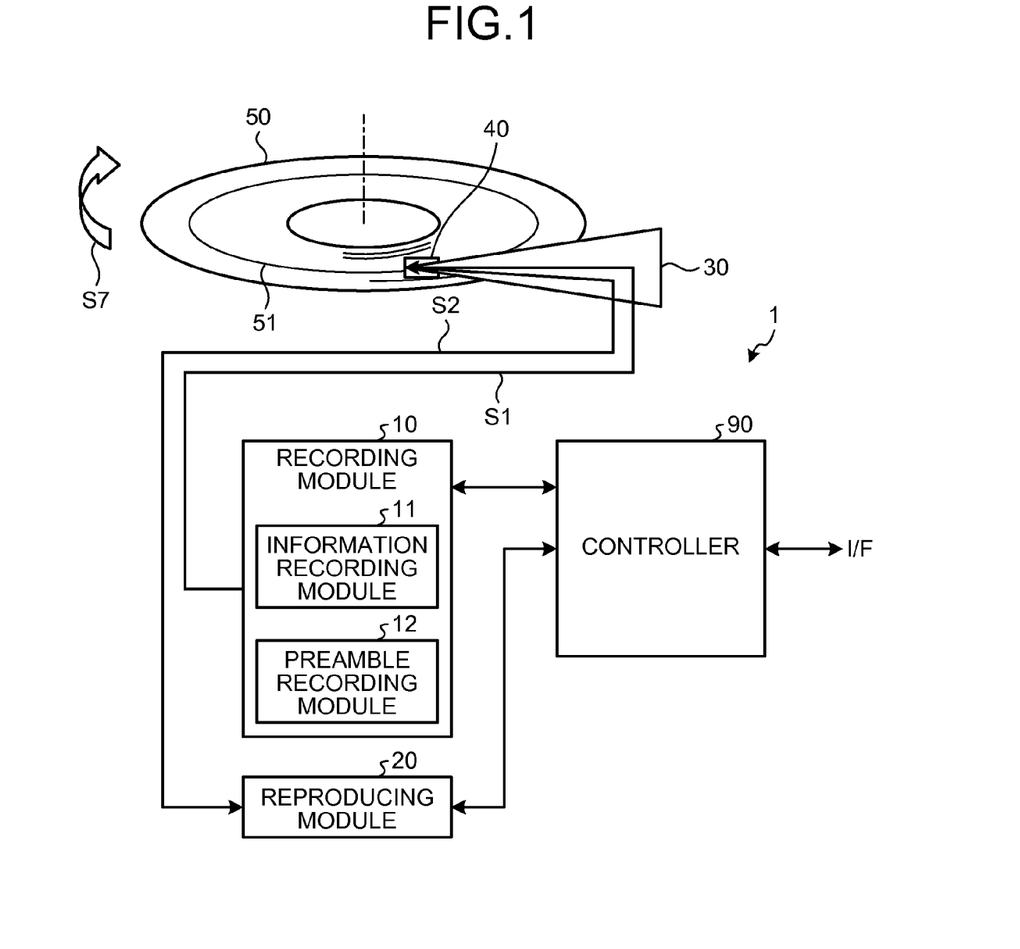
FIG. 1 is an exemplary schematic block diagram of a magnetic disk device according to an embodiment of the invention.

FIG. 1 is a schematic block diagram of functional structures of a magnetic disk device 1 comprising a recording system and a reproducing system according to the embodiment. The magnetic disk device 1 comprises a recording module 10, a reproducing module 20, a controller 90, a head supporting and positioning mechanism 30, a slider 40, and a magnetic recording medium 50.

The recording module 10 outputs a recording signal S1 to the head supporting and positioning mechanism 30. The recording module 10 comprises an information recording module 11 and a preamble recording module 12. The information recording module 11 records information by controlling a recording element comprised in the slider 40 while recording information. The recording element controlled by the information recording module 11 records data with a certain length on a recording medium in a relative movement direction of the magnetic recording medium 50 and the recording element. Subsequently, the recording element records next data with the same length as that of the previously recorded data from the same recording start position as that of the previously recorded data in the relative movement direction but slightly offset from a line of previously recorded data in a direction perpendicular to the line, so that an overlaying portion is formed by the line of previously recorded data and the line of subsequently recorded data. This operation is repeated a plurality of times to complete the recording for one information recording region.

The preamble recording module 12 controls the recording element comprised in the slider 40 to record preamble information or the like. The recording element controlled by the preamble recording module 12 records a preamble in a region positioned in front of the information recording region. The preamble is the information to be used for clock extraction, reproduction signal amplitude adjustment, or the like. The "region positioned in front of the information recording region" is a region on the recording medium, and is adjacent to the information recording region in a direction opposite to the relative movement direction of the recording medium and the recording element.

The reproducing module 20 controls a reading element comprised in the slider 40 while reproducing information. The reading element controlled by the reproducing module 20 reads data in the information recording region recorded on the recording medium. The reproducing module 20 performs a signal process (two-dimensional signal process) by developing data in the information recording region recorded on the magnetic recording medium 50 into a two-dimensional plane to demodulate the recorded data.

The controller 90 controls the recording module 10 and the reproducing module 20. The head supporting and positioning mechanism 30 moves the slider 40 to the position on the magnetic recording medium 50, determined by the recording module 10 and the reproducing module 20.

The slider 40 has the recording element and the reading element. The reading element comprised in the slider 40 has high resolution, reads all signal values in the information recording region, and outputs a reproduction signal S2 to the reproducing module 20.

The magnetic recording medium 50 has tracks 51. Information is recorded on or read from the tracks 51. An arrow S7 indicates the rotation direction of the recording medium.

Figure 2:
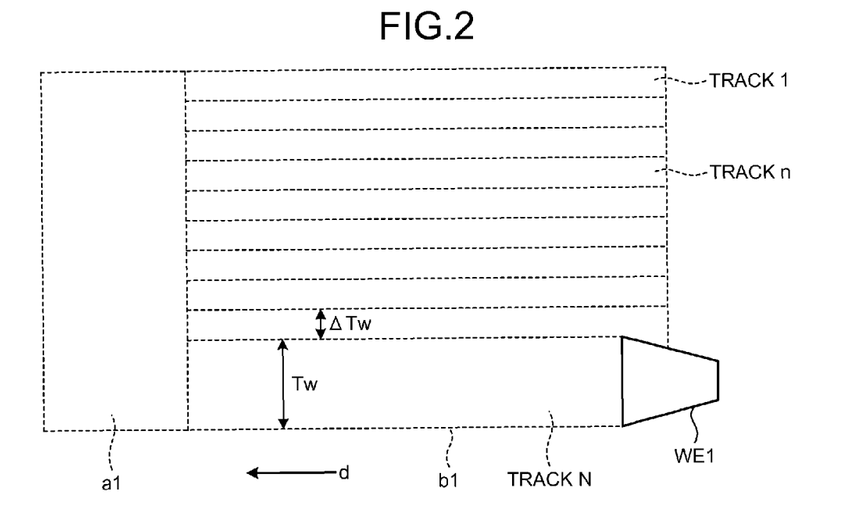
FIG. 2 is an exemplary explanatory diagram of an information recording region and a preamble region in the embodiment.

FIG. 2 is a schematic diagram for explaining an example of an information recording region and a preamble region comprised in the magnetic recording medium 50. FIG. 2 illustrates a preamble region a1 and an information recording region b1. A recording element WE1 writes data with a length of M bits on a first track 1. Subsequently, another M bits is recorded on the second track 2 by: offsetting the position of the recording element WE1 with only ΔTw in a direction perpendicular to the movement direction of the magnetic recording medium 50; and recording the another M bits from the same recording start position as that of the first track 1 in the relative movement direction of the magnetic recording medium 50 and the recording element WE1. The similar operations are performed to record data on the third track, the fourth track, and so on in order. Then, when data is recorded on the Nth track (N≧2), the recording for an area corresponding the single information recording region is completed. The information recording region b1 has N tracks of M bits in the movement direction of the magnetic recording medium 50, and its recording capacity is M×N bits.

An arrow d indicates the movement direction of the magnetic recording medium 50, and a width Tw is the width of one track. The last track N has a width larger than those of the other tracks.

The preamble region a1 is a region positioned in front of the information recording region b1 that is unit (sector) of data recording formed in such a manner. The preamble region a1 comprises the preamble to perform clock extraction, reproduction signal amplitude adjustment, or the like.

Figure 3:
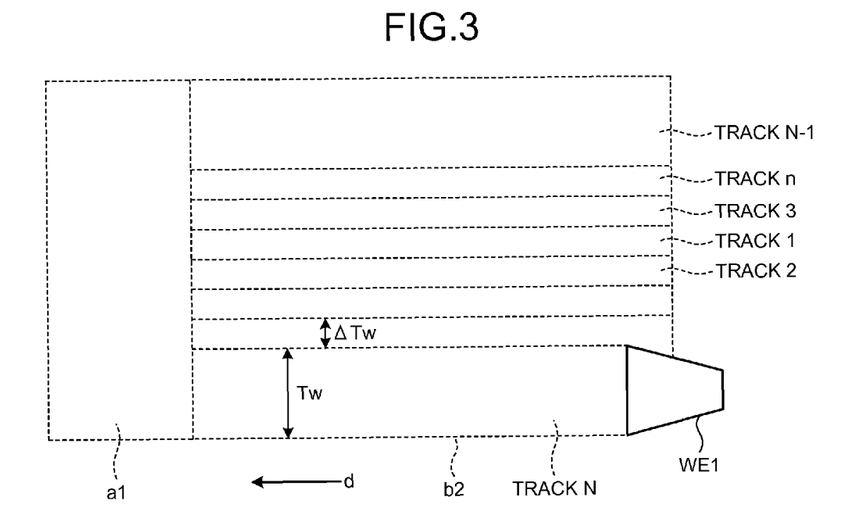
FIG. 3 is another exemplary explanatory diagram of the information recording region and the preamble region in the embodiment.

FIG. 3 is a schematic for explaining another example of the information recording region and the preamble region comprised in the magnetic recording medium 50. FIG. 3 illustrates the preamble region a1 and an information recording region b2. The recording element WE1 writes data with a length of M bits on the first track 1 positioned substantially at a center of the information recording region b1. Subsequently, another M bits is recorded on the second track 2 by: offsetting the position of the recording element WE1 with only ΔTw in a downward direction of FIG. 3 perpendicular to the movement direction of the magnetic recording medium 50; and recording the another M bits from the same recording start position as that of the first track 1 in the relative movement direction of the magnetic recording medium 50 and the recording element WE1.

Subsequently, recording is performed on the third track 3 by offsetting only ΔTw from the track 1 in a direction opposite to the second track. Still another M bits are further recorded on the fourth track, and the recordings are repeated so on in this order by increasing an offsetting amount alternatively in positive and negative directions perpendicular to the tracks with respect to the first track 1 at predetermined steps. Finally, the recording is performed on the Nth track (N≧2) to complete the recording for the single information recording region. The information recording region b2 has N tracks of M bits in the movement direction of the magnetic recording medium 50, and its recording capacity is M×N bits.

The preamble region a1 is the same as that in the example of FIG. 2, thereby the explanation is omitted.

Figure 4:
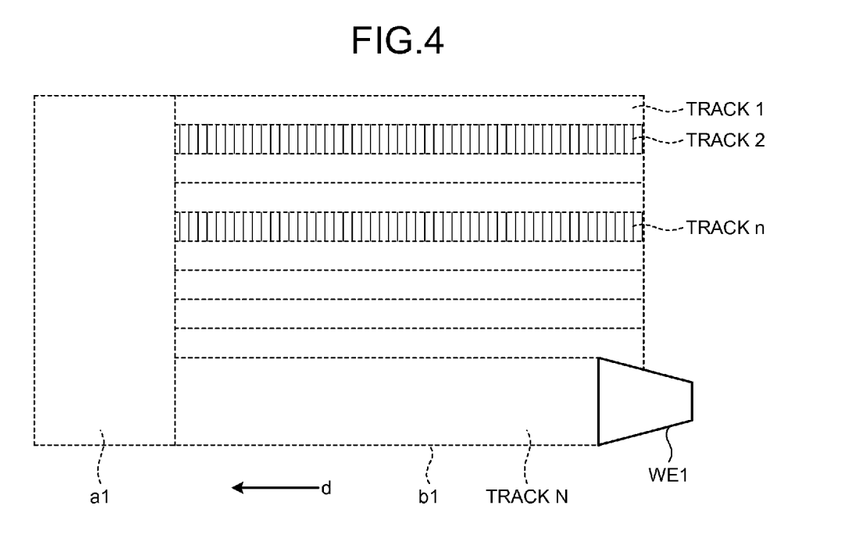
FIG. 4 is an exemplary schematic diagram of clock signals recorded in the information recording region in the embodiment.

FIG. 4 is a schematic diagram of an example of recording of clock signals recorded in the information recording region. FIG. 4 is an example in which clock signals are recorded in the information recording region b1 illustrated in FIG. 2. The clock signals comprising frequency information and phase information that are to be extracted from the preamble recorded in a preceding region, are recorded on two data recording lines of the track 2 and a track n comprised in the information recording region b1.

Figure 5:
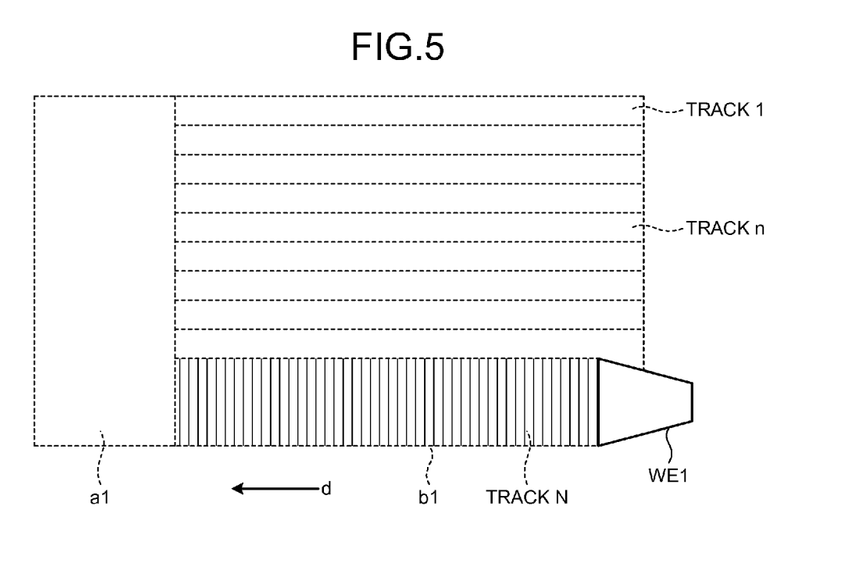
FIG. 5 is another exemplary schematic diagram of the clock signals recorded in the information recording region in the embodiment.

FIG. 5 is a schematic diagram of an example of the recording of a clock signal recorded in the information recording region. FIG. 5 is an example in which a clock signal is recorded in the information recording region b1 illustrated in FIG. 2. In FIG. 5, the clock signal comprising frequency information and phase information that are to be extracted from the preamble recorded in a preceding region, is recorded on a data recording line of the track N that is the last track having a width larger than those of the other lines of data. With the example of FIG. 5, the quality of the clock signal can be improved during reading because the recording area of the track on which clock information is recorded is large.

Figure 6:
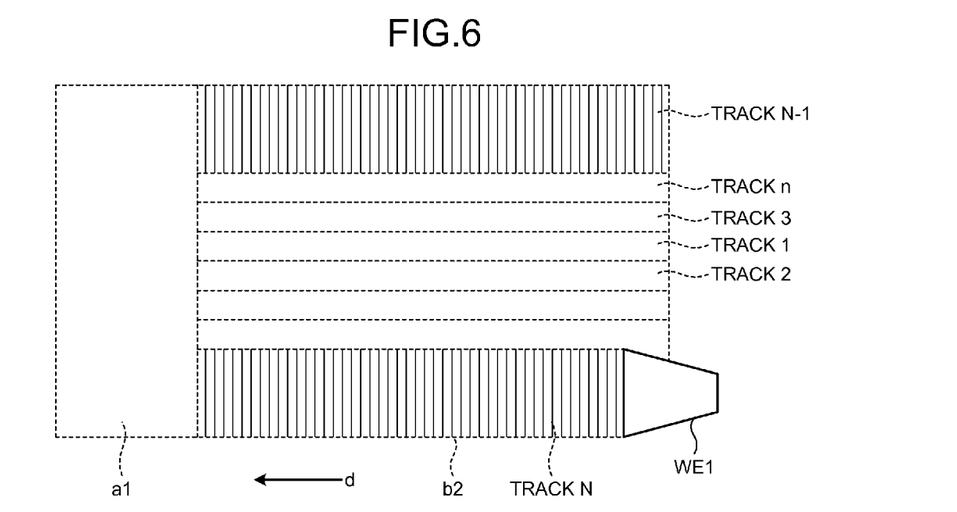
FIG. 6 is still another exemplary schematic diagram of the clock signals recorded in the information recording region in the embodiment.

FIG. 6 is a schematic diagram of another example of recording of clock signals recorded in the information recording region. FIG. 6 is an example in which clock signals are recorded in the information recording region b2 illustrated in FIG. 3. In FIG. 6, the clock signals comprising frequency information and phase information that are to be extracted from the preamble recorded in a preceding region, are recorded on two lines of data of a track N-1 and the track N that are positioned at both ends of the information recording region b2. With the example of FIG. 6, the quality of the clock signals can be improved during reading because the clock signals are written in the lines of data that have large widths as with the example of FIG. 5.

Figure 7:
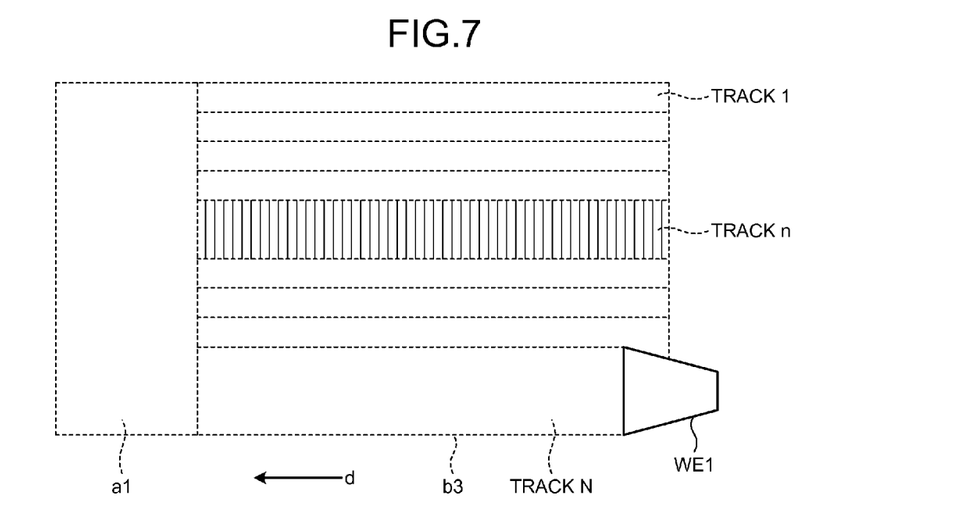
FIG. 7 is still another exemplary schematic diagram of the clock signals recorded in the information recording region in the embodiment.

FIG. 7 is a schematic of another example of the recording of the clock signals recorded in an information recording region. FIG. 7 is an example in which a clock signal is recorded in an information recording region b3 on which lines of data are recorded in the same order as those in the information recording region b1 illustrated in FIG. 2. In FIG. 7, the width of the line of data of the track n in the information recording region b3 is formed to be larger than those of the other tracks. The clock signals comprising frequency information and phase information that are to be extracted from the preamble recorded in a preceding region, are recorded in this line of data. With this example, the quality of the clock signal can be improved during reading, because the recording area of the track on which the clock signal is recorded is large.

Figure 8:
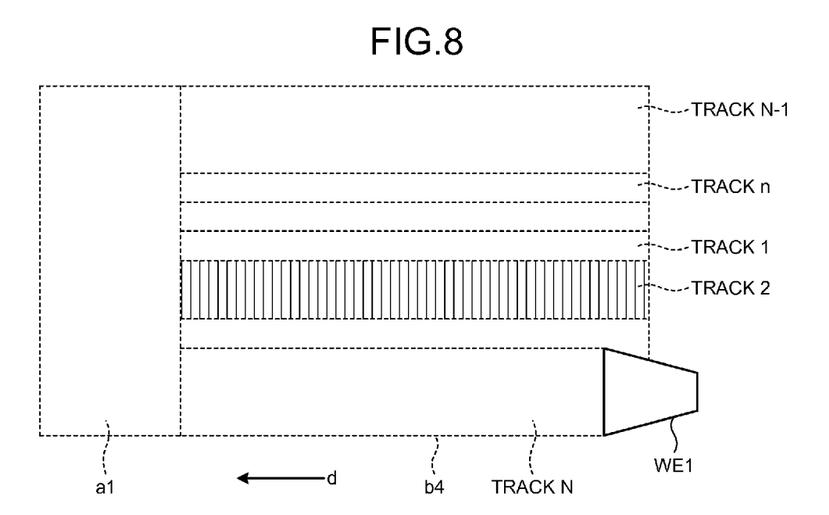
FIG. 8 is still another exemplary schematic diagram of the clock signals recorded in the information recording region in the embodiment.

FIG. 8 is a schematic of an example of recording of a clock signal recorded in an information recording region. FIG. 8 is an example in which clock signals are recorded in an information recording region b4 on which lines of data are recorded in the same order as those in the information recording region b2 illustrated in FIG. 3. In FIG. 8, the width of the line of data of the track 2 in the information recording region b4 is formed to be larger than those of the other tracks. The clock signals comprising frequency information and phase information that are to be extracted from the preamble recorded in a preceding region, are recorded in this line of data. As with the other examples, the quality of the clock signals can be improved during reading, because the recording area of the track on which the clock signals are recorded is large.

Figure 9:
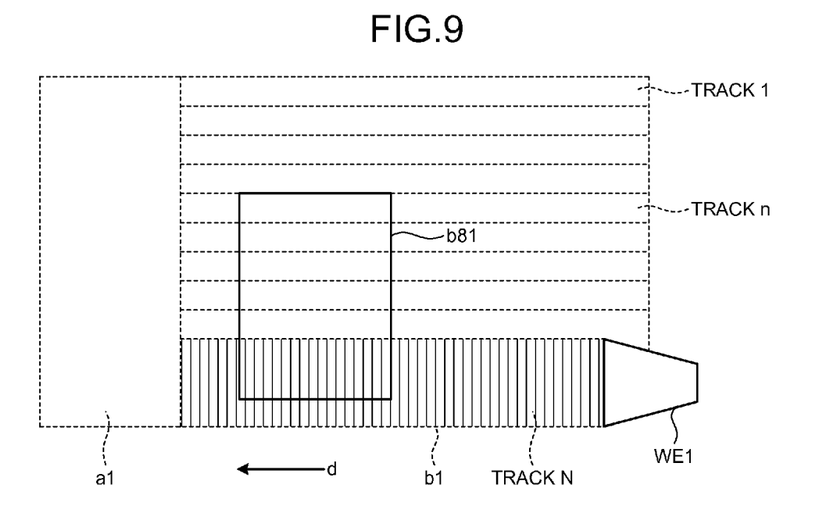
FIG. 9 is an exemplary explanatory diagram of read data developed into a two-dimensional plane in the embodiment.
Figure 10:
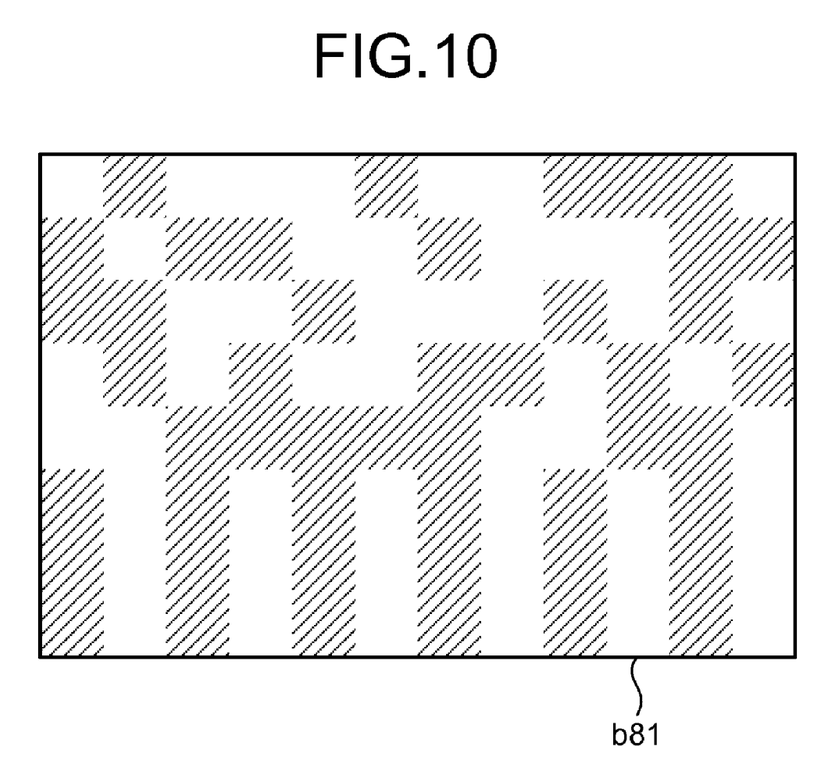
FIG. 10 is still another exemplary explanatory diagram of the read data developed into the two-dimensional plane in the embodiment.

FIGS. 9 and 10 are schematic diagrams for explaining examples in which read data is developed into a two-dimensional plane. FIG. 9 illustrates the same information recording region b1 as the example illustrated in FIG. 5, and indicates one region b81 with a thick line. FIG. 10 illustrates read data of the region b81 of the information recording region b1 of FIG. 9 being developed into a two-dimensional plane.

According to the embodiment of the invention, in the shingle write/TDMR system, or the like that is prospective for achieving a high recording density, clock information with sufficient accuracy necessary for the two-dimensional signal process is obtained. Thus, the surface recording density can be increased, which enables the capacities of magnetic disk devices to increase. As a result, storages that support an explosive growth in the amount of information in the future can be achieved, and diverse demands in various information arising from the rapid development of IT can be satisfied at a high level.

A magnetic recording apparatus and a magnetic recording medium according to the embodiment of the invention, which employs a magnetic recording method for reading out unit data of recording/reproduction and performs a two dimensional signal processing, is capable of stably obtain clock signals for processing two dimensional signals.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording apparatus, comprising:
an information recording module configured to record a predetermined number of lines of information with a predetermined length in an information recording region of a magnetic recording medium, each line of information having a same recording start position with respect to a relative movement direction of the magnetic recording medium and a recording element, each line of information comprising an overlapping portion of adjacent lines of information,
wherein the information recording module is configured to record clock information in one or a plurality of the lines of information.

2. The magnetic recording apparatus of claim 1, wherein a width of a region of the one or the plurality of the lines of information configured to store the clock information is larger than widths of regions of the lines of information other than the one or the plurality of the lines of information.

3. The magnetic recording apparatus of claim 1, wherein the information recording module is configured to record the clock information in at least one of a region of one of the lines of information at an end of the information recording region and the plurality of the lines of the information.

4. The magnetic recording apparatus of claim 1, further comprising a reproducing module configured to acquire the information from data read out from the information recording region by a single reading.

5. A magnetic recording medium, comprising:
an information recording region configured to store a predetermined number of lines of information with a predetermined length in a relative movement direction of the magnetic recording medium and a recording element, each line of information having a same recording start position with respect to the relative movement direction, each line of information comprising an overlapping portion with adjacent lines of information,
wherein one or a plurality of the lines of information is configured to store clock information.

* * * * *